(No Model.)

G. B. PORTER.
CATTLE STANCHION.

No. 548,928. Patented Oct. 29, 1895.

Witnesses:
Albert B. Blackwood.
Carleton E. Snell.

Inventor:
George B. Porter,
by J. H. Soulé and Co.
his Attorneys

UNITED STATES PATENT OFFICE.

GEORGE B. PORTER, OF AFTON, ASSIGNOR OF ONE-HALF TO HIRAM A. IRELAND, OF BAINBRIDGE, NEW YORK.

CATTLE-STANCHION.

SPECIFICATION forming part of Letters Patent No. 548,928, dated October 29, 1895.

Application filed March 22, 1895. Serial No. 542,827. (No model.)

*To all whom it may concern:*

Be it known that I, GEORGE B. PORTER, a citizen of the United States, residing at Afton, in the county of Chenango and State of New York, have invented certain new and useful Improvements in Cattle-Stanchions; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cattle-stanchions of a familiar type wherein there is a vertical movable bar pivoted in a frame and having an open position to permit the head of the animal to enter between it and the side of the frame, and means for automatically releasing, closing, and locking said movable bar to prevent the withdrawal of the animal's head.

The invention consists in certain improvements in the construction of such a contrivance, and particularly in the releasing and locking devices.

The accompanying drawings illustrate a cattle-stanchion embodying the present improvements.

Figure 1:
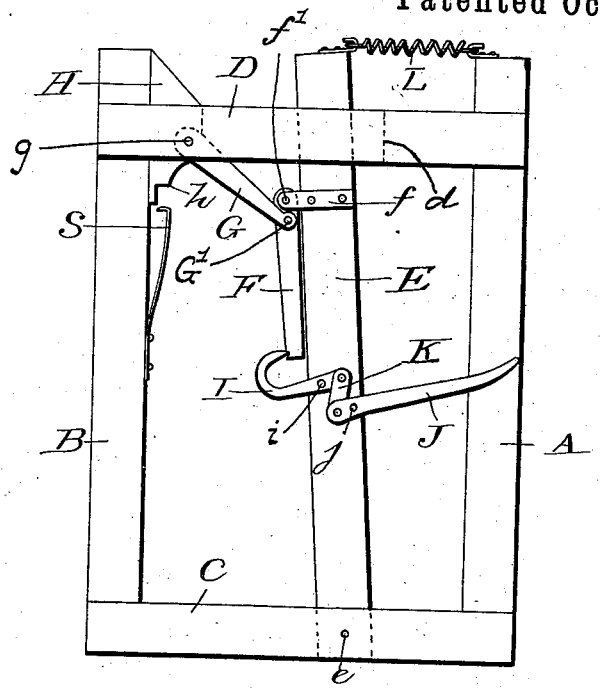
Figure 2:
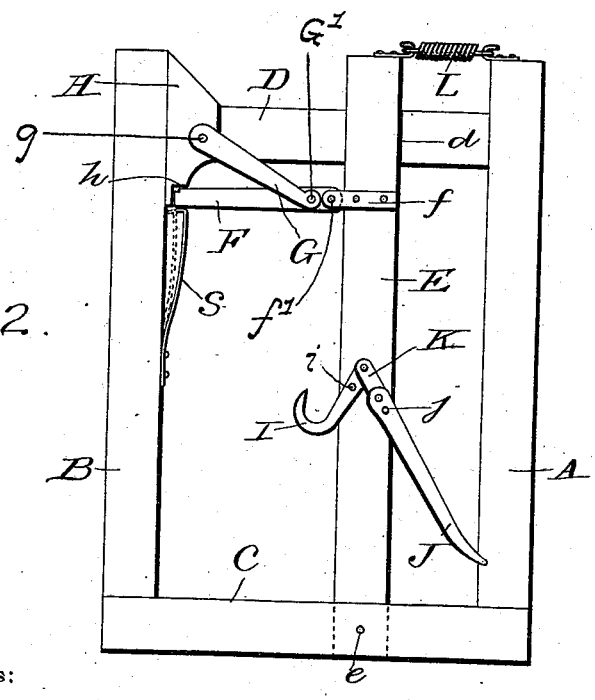

Figure 1 is a side elevation showing the parts in their open position. Fig. 2 is a similar view, but with one of the upper horizontal cross-pieces of the frame removed, showing the parts in their closed position.

In the drawings, A B are the vertical side pieces or posts of the frame, and C D are the horizontal cross-pieces. Preferably the cross-pieces are made double, being composed of two flat pieces secured on opposite sides of the uprights A B and leaving between them a space equal to the thickness of said uprights.

Between the lower cross-pieces C C of the frame at *e* is pivoted the movable bar E, which extends upwardly within the frame A B C D, and its upper free end passes between and beyond the upper cross-pieces D D. The pivoted bar E has a closed position parallel with the uprights A B, Fig. 2, and an open position with its upper end inclined away from the upright A, Fig. 1. When the bar E occupies its open inclined position, there is sufficient space between said bar and the post A to allow the head of an animal to be inserted; but when the bar is moved to its vertical closed position against the animal's neck the space between said bar and post is sufficiently reduced so that the animal cannot withdraw its head. The movement of the bar in closing is limited by a stop *d*, formed by a block secured between the cross-pieces D D at the proper place to stop the bar when it reaches its vertical closed position.

The position of the bar E is controlled by the following means: Pivoted to the bar E a little below the plane of the upper cross-pieces D is a lever-arm F. This lever-arm F is located at the edge of bar E away from the upright A, being pivoted to the bar by means of a strap *f*, which is secured to and embraces the bar and carries the pivot *f'* of the lever. Secured to the upright B of the frame, between the upper cross-bars D, is a block H, and to said block is pivoted at *g* one end of an arm or pair of arms G, in whose outer end the lever-arm F is fulcrumed at G'. The pivoting of the arms G provides a movable fulcrum for the lever-arm F, which makes it possible to pivot the lever-arm directly to the bar E without the interposition of a link.

When the bar E is moved in either direction, the lever-arm F turns on its fulcrum, and reversely by swinging the lever-arm F the bar E may be moved open or shut. The fulcrum G' of the lever-arm F is near the pivoted end of said lever-arm, and consequently the lever-arm swings through an extensive arc (about ninety degrees) while the bar E traverses the slight distance between its open and closed positions. When the bar is open, Fig. 1, the lever-arm F lies parallel with and against the edge of the bar, and when the bar is closed, Fig. 2, the lever-arm occupies a horizontal position perpendicular to the bar. Since the bar E, swinging on pivot *e*, and the lever-arm F, swinging on fulcrum G', are pivoted together at *f'*, neither can move independently of the other, and consequently to hold the bar in its open position it is only necessary to retain the lever-arm F depressed against the side of the bar.

This is done by means of a hook or catch I, pivoted to the bar E at $i$ and arranged to engage and hold the end of lever-arm F, as shown in Fig. 1. The point of the lever-arm may be notched, as shown, so as to be more securely engaged by the hook. As long as the lever-arm is engaged by the hook I and thereby held depressed against the side of the bar E the bar remains in its open position.

A little below the pivot $i$ of the hook I there is pivoted to the bar E at $j$ a lever J, the long arm of which extends across the space between the bar E and the side piece A of the frame, while its short arm is connected with the tail of hook I by a link K, whose ends are pivoted to said hook and lever, respectively. The lever J constitutes the means for automatically releasing the depressed lever-arm F when the bar E is to be closed. The releasing-lever is located at such a height that when the animal puts its head through the stanchion-frame above said lever and then reaches for fodder placed in a trough beyond and at the foot of the frame its neck will move the long arm of the lever downward, thus elevating the short end of the lever, the link K, and the tail of the hook, lowering the point of the hook and releasing the depressed lever-arm F. A coiled spring L connects the upper end of bar E with the upper end of the frame-piece A and tends to close the bar, so that as soon as the lever-arm F is released the bar E moves to its closed position. The closing movement of the bar swings the lever-arm F up to its elevated horizontal position shown in Fig. 2 of the drawings. A rectangular notch or seat $h$ in the lower corner of the block H receives the end of the lever-arm, and a spring-plate S, which is attached to the side piece B of the frame and which is depressed by the end of the lever-arm in its upward movement, springs outward below the notch $h$ and imprisons the end of the lever-arm therein. When the lever-arm is thus extended horizontally, it acts as a brace to absolutely prevent any opening of the bar E, the inner end of said lever-arm abutting against the edge of bar E, and the outer end of said lever-arm abutting against the block H at the vertical side of notch $h$. Consequently when the lever J is operated, as stated, to retract catch-hook I and release the lever-arm F, and when the bar E is then automatically closed by the spring L, the lever-arm is at the same time automatically moved up to its horizontal bracing position and securely locks the bar. After being locked the bar cannot be opened until the spring-plate S is sprung out of the path of the lever-arm F. When it is desired to open the bar, the spring-plate is pressed in out of the way and the end of the lever-arm released from its seat $h$, and either the lever-arm is pulled down until the bar is opened or the bar is pulled open until the lever-arm is depressed. The bar is then held open by moving the hook I into engagement with the end of the lever-arm.

I claim as my invention—

1. A cattle stanchion comprising a frame, a bar pivoted to said frame and movable (when released) from an open to a closed position, means for releasing said bar, and means for moving said bar automatically, a lever independent of said releasing means connected with said bar and turning on a fulcrum carried by the frame so that said bar cannot move independently of said lever, and a catch controlled by the releasing means aforesaid for retaining said lever in position to hold the bar open, substantially as set forth.

2. A cattle stanchion comprising a frame, a bar pivoted to said frame and movable (when released) from an open to a closed position, means for releasing said bar, and means for moving said bar automatically, a lever independent of said releasing means connected with said bar and turning on a fulcrum carried by the frame so that the movement of said bar is communicated to said lever, said lever being so arranged with respect to said bar and stanchion frame that when said bar is moved to a closed position said lever simultaneously moves to a position to brace and lock said bar, substantially as set forth.

3. A cattle stanchion, comprising a frame, a movable bar pivoted to said frame and arranged to be secured in an open position, means for releasing said bar, and means for automatically closing it, in combination with a lever independent of said releasing means pivoted to said bar and turning on a movable fulcrum carried by said frame, said lever assuming a depressed position when said bar is open and an elevated position when said bar is closed, a catch on the bar which holds said lever depressed in order to keep the bar open, and a catch on the frame which holds said lever elevated in order to keep the bar closed, substantially as set forth.

4. A cattle stanchion comprising a frame and a movable bar pivoted in said frame, means for moving said bar automatically from an open to a closed position, and releasing means actuated by the animal for permitting said bar to so move, in combination with a lever independent of said releasing means pivoted to said bar and turning on a fulcrum carried by the frame, said lever being engaged in one position to hold said bar in its open position and being moved automatically when said bar is closed to a position to brace said bar and lock it in its closed position substantially as set forth.

5. The stanchion frame, the bar E pivoted therein, and means for moving said bar automatically from an open to a closed position, in combination with the locking lever F pivoted to said bar and moving therewith, an arm G pivoted to said frame and carrying the fulcrum of said lever, the catch I for retaining said lever in one position to prevent the closing of said bar, the catch S for retaining said lever in position to prevent the opening of said bar, and means for releasing the lever from catch I and permitting it to move into engagement with catch S, substantially as set forth.

6. The stanchion frame and the bar E pivoted therein and arranged so as to have a normal tendency to move to a closed position, in combination with the lever F for holding said bar in an open position, pivoted to said bar and turning on a fulcrum carried by the frame, the catch I pivoted to said bar for retaining said lever in position to hold the stanchion open, and the releasing lever J pivoted on said bar for disengaging said catch I and lever F to permit the stanchion bar to move to its closed position, substantially as set forth.

7. The movable stanchion bar E, means for moving it to a closed position and the lever F fulcrumed to the stanchion frame and pivoted to said bar near its upper end, said lever projecting downwardly in line with said bar when the stanchion is open, in combination with the catch I carried by said bar and engaging the lower end of said lever F to hold the stanchion open, the releasing lever J pivoted on said bar, and the link K, connecting the tail ends of said lever J and catch I, so that downward movement of said releasing lever will move said catch I downward to disengage from lever F, substantially as set forth.

8. A cattle stanchion, comprising a frame and a movable bar pivoted therein, the locking lever F pivoted to said bar, the fulcrum G' for said locking lever, means independent of said locking lever for automatically closing said bar, and thereby swinging said locking lever on its fulcrum, the seat $h$ which receives the free end of said locking lever when the bar is closed, and the spring catch S which automatically engages the end of the locking lever to lock it to its seat, substantially as set forth.

In testimony whereof I affix my signature in presence of two witnesses.

GEORGE B. PORTER.

Witnesses:
IRVING J. TILLMAN,
MELROSE M. LATHROP.